D. C. Stover.
Attachment for Cultivator-Shovel.
N° 76847.  Patented Apr. 14, 1868.
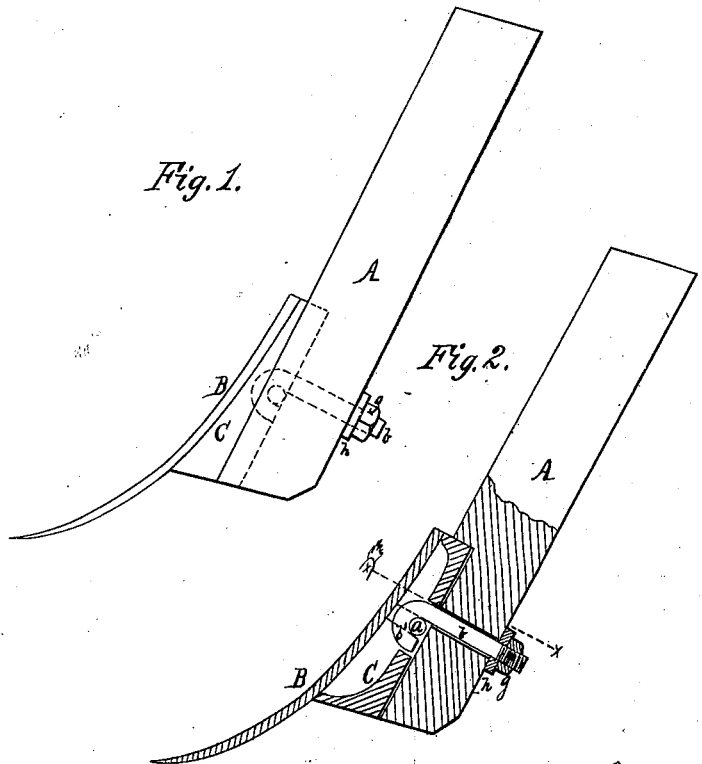
Fig. 1.
Fig. 2.
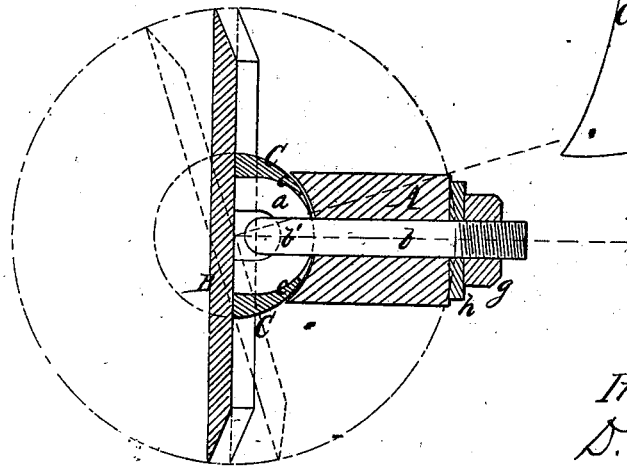
Fig. 3.
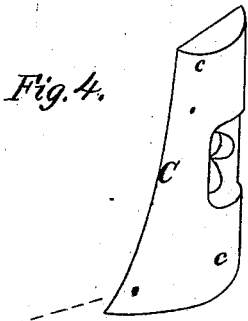
Fig. 4.
Witnesses.
Inventor
D. C. Stover
by Mason, Fenwick & Lawrence.

United States Patent Office.

D. C. STOVER, OF DAYTON, OHIO.

Letters Patent No. 76,847, dated April 14, 1868.

---

IMPROVED ATTACHMENT FOR CULTIVATOR-SHOVELS.

---

The Schedule referred to in these Letters Patent and making part of the same.

---

TO ALL WHOM IT MAY CONCERN:

Be it known that I, D. C. STOVER, of Dayton, in the county, of Montgomery, and State of Ohio, have invented a new and improved Mode of Attaching Cultivator-Shovels to their Standards; and I do hereby declare that the following is a full, clear, and exact description thereof, reference being had to the accompanying drawings, making a part of this specification, in which—

Figure 1 is a side view of the shovel and its standard.

Figure 2 is a vertical sectional view of the same.

Figure 3 is an enlarged sectional view of the same, taken in the plane $x$ $x$, marked on fig. 2.

Figure 4 is a perspective view of the circular bearing.

Similar letters of reference indicate corresponding parts in the several figures.

This invention relates to a new and improved mode of securing a shovel to its standard, whereby a rigid attachment can be readily effected, and the shovel adjusted and set at any desired angle with respect to the line of draught, without changing the position of the vertical centre of the shovel with respect to a vertical central plane intersecting the centre of the shovel-standard.

Prior to my invention shovels have been applied to their standards in a variety of ways, which would allow them to be adjusted from a position at right angles to the line of draught, and secured at any desired angle with relation thereto, for the purpose of throwing more or less earth toward or from the rows of plants while cultivating the same. One objection which attends the modes hitherto adopted is, that the shovels cannot be adjusted from a position at right angles to the line of draught, without moving them bodily to one side or the other of the centre of the standard, and thereby causing the pressure against the shovels to operate to disadvantage in the operation of the implement.

To overcome the objection above cited, and also to produce a very simple and rigid attachment, the nature of my invention consists in a hooked bolt and staple fastening, combined with a semi-cylindrical segment-bearing, which is interposed between the shovel and a corresponding recess formed in the front of the standard, so arranged that the vertical axis of motion of the shovel shall, at all times, coincide with a vertical longitudinal plane, intersecting the vertical longitudinal plane passing centrally through the centre of the shovel-standard, as will be hereinafter described.

To enable others skilled in the art to understand my invention, I will describe its construction and operation.

In the accompanying drawings, A represents the shovel-standard, and B represents the shovel, which latter may be made of the usual well-known shape, common to shovels of most cultivators.

To the back of the shovel, B, and in the vertical centre thereof, a staple, $a$, is rigidly secured a short distance below its upper edge, as shown in figs. 2 and 3. The opening through this staple is in line with the length of the shovel, and is designed to receive a hook, $b'$, which is formed on one end of a screw-bolt, $b$, and to form a slip-jointed connection, as will be hereinafter explained.

Between the back of the shovel B and the front edge of the standard A, a casting, C, is interposed, which is constructed so that its front surface will conform to and fit snugly against the back surface of the shovel B, and also with a rounded back surface, $c$, which latter is fitted into a recess, which is made in the front edge of the standard, as shown in figs. 2 and 3.

The casting C is also constructed with a cross-opening through it, for receiving the staple $a$, and also for receiving the hook $b'$, and allowing the stem or shank of this hook to pass through it, and also through the standard A, as shown in figs. 2 and 2.

This bolt has a screw-thread cut on its rear end, for receiving a nut, $g$, which, with the washer $h$, will serve to confine the shovel, and its bearing C, rigidly in place in any position which it may be desired to adjust the shovel.

The rounded surface $c$ of the casting C is concentric to point $i$, shown in fig. 3, which is the vertical axis of motion of the shovel. This rounded casting C is designed to serve as a movable bearing, which being fitted into a recess in the shovel-standard A, of corresponding shape to the rounded surface of this bearing, will allow the shovel to be turned about its axis $i$, either toward the right hand or the left, without changing the position of said axis. The connection formed by the staple $a$ and hooked bolt will allow the bearing C to slip and turn about its axis, when the nut $g$ is loosened, and, when this nut is set up tightly, the three parts A B C will be rigidly secured together.

By thus applying a shovel to its standard, the former can be readily adjusted and set at any desired angle with respect to the line of draught, and, while this is the case, the central position of the shovel with respect to the vertical longitudinal centre of the standard A will be maintained, and consequently the shovel and standard will not be subjected to serious lateral pressure.

Another advantage of my improvement over the old modes of applying shovels to their standards is, that the shovels of a gang are not set so far out of line as to leave untilled spaces in the earth between them in the operation of cultivating rows of plants.

Having described my invention, what I claim as new, and desire to secure by Letters Patent, is—

1. The bearing C, fitted between the shovel B and standard A, in combination with a slip-joint fastening, substantially as and for the purposes described.

2. The staple $a$, fastened to the shovel B, and the hooked bolt-fastening $b\ b'$, in combination with the rounded bearing portion C, interposed between the shovel B and recessed standard A, substantially as described.

3. So attaching the shovel B to its standard A, that the shovel can be adjusted and set at different angles with respect to the line of draught, without changing the axis of movement of said shovel out of its true line, substantially as described.

D. C. STOVER.

Witnesses:
E. THOMPSON,
P. C. KELLY.